United States Patent
Fotland et al.

(10) Patent No.: US 11,442,463 B1
(45) Date of Patent: Sep. 13, 2022

(54) SYSTEM TO DETERMINE STATIONARY FEATURES BY AUTONOMOUS MOBILE DEVICE

(71) Applicant: AMAZON TECHNOLOGIES, INC., Seattle, WA (US)

(72) Inventors: David Allen Fotland, San Jose, CA (US); Ishan Ankur Patil, Mountain View, CA (US); Yan Lu, Newark, CA (US); Joydeep Biswas, Austin, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 337 days.

(21) Appl. No.: 16/579,059

(22) Filed: Sep. 23, 2019

(51) Int. Cl.
 *G05D 1/02* (2020.01)
 *G05D 1/00* (2006.01)
 (Continued)

(52) U.S. Cl.
 CPC ......... *G05D 1/0251* (2013.01); *G05D 1/0088* (2013.01); *G05D 1/027* (2013.01);
 (Continued)

(58) Field of Classification Search
 CPC .... G05D 1/0251; G05D 1/0088; G05D 1/027; G05D 1/0272; G05D 1/0257;
 (Continued)

(56) References Cited

U.S. PATENT DOCUMENTS

| | | | |
|---|---|---|---|
| 2005/0196034 A1* | 9/2005 | Hattori | G06K 9/00805 382/154 |
| 2007/0053584 A1* | 3/2007 | Nagaoka | G06K 9/00805 382/154 |

(Continued)

OTHER PUBLICATIONS

Di Leo, et al., "Covariance propagation for the uncertainty estimation in stereo vision." IEEE Transactions on Instrumentation and Measurement 60.5 (2011): 1664-1673.Retrieved from the Internet: https://www.semanticscholar.org/paper/Covariance-Propagation-for-the-Uncertainty-in-Leo-Liguori/995ab1681bc4695b3e703a09baaed2560ad09971 #paper-header.

(Continued)

*Primary Examiner* — Nga X Nguyen
(74) *Attorney, Agent, or Firm* — Lindauer Law, PLLC

(57) ABSTRACT

An autonomous mobile device moves through a physical space using simultaneous localization and mapping (SLAM) techniques. SLAM processes images from cameras to determine localization and trajectory of the device based on features that are assumed to be stationary. SLAM performance is improved by removing moving features from consideration. A first position of a feature at a first time and data from an inertial sensor are used to determine a predicted position at a second time. The predicted position is compared to a second position of the feature at the second time. This comparison takes into consideration an assumed Gaussian error distribution of how the positions are determined. If the predicted position differs from the second position by less than a threshold value, the feature may be determined to be stationary. The stationary features are then processed using SLAM to determine the localization and trajectory information.

20 Claims, 7 Drawing Sheets

(51) Int. Cl.
    *G06T 7/10*           (2017.01)
    *G06T 7/73*           (2017.01)
    *G06V 20/58*          (2022.01)

(52) U.S. Cl.
    CPC ............. *G05D 1/0272* (2013.01); *G06T 7/74* (2017.01); *G06V 20/58* (2022.01); *G05D 1/0257* (2013.01); *G06T 2207/10012* (2013.01); *G06T 2207/30242* (2013.01); *G06T 2207/30261* (2013.01)

(58) Field of Classification Search
    CPC .................. G06K 9/00805; G06T 7/74; G06T 2207/10012; G06T 2207/30242; G06T 2207/30261; G06V 20/58
    See application file for complete search history.

(56) References Cited

U.S. PATENT DOCUMENTS

| | | | | |
|---|---|---|---|---|
| 2008/0199050 | A1* | 8/2008 | Koitabashi | ............. H04N 5/225 382/107 |
| 2018/0188027 | A1* | 7/2018 | Zhang | ..................... G06T 7/248 |
| 2018/0300562 | A1* | 10/2018 | Yamada | ..................... G06T 7/00 |

OTHER PUBLICATIONS

Hartley, et al., "Multiple View Geometry in Computer Vision". [BOOK] Cambridge University Press 2003.

Mahalanobis Distance, "Mahalanobis distance—Wikipedia". Retrieved from the Internet on Sep. 5, 2019: https://en.wikipedia.org/wiki/Mahalanobis_distance.

\* cited by examiner

SYSTEM TO DETERMINE STATIONARY FEATURES BY AUTONOMOUS MOBILE DEVICE

BACKGROUND

An autonomous mobile device (AMD) moves throughout a physical space. To facilitate this movement, the AMD uses information about where it is in the physical space, and location of obstacles.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
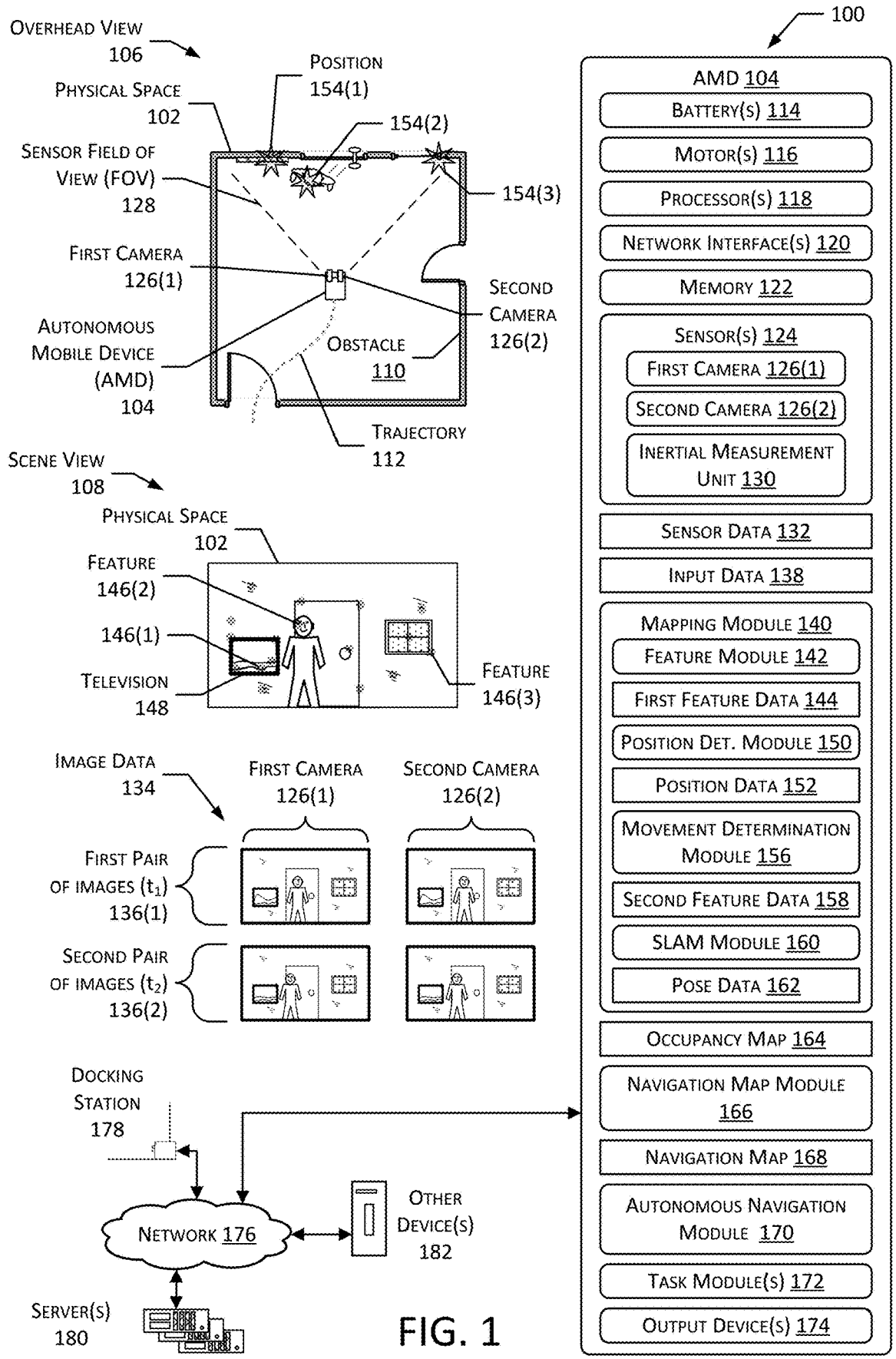
FIG. 1 illustrates a system for determining stationary features in a physical space with an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may perform sentry tasks involving moving through rooms in the physical space.

During autonomous movement, the AMD needs to have information about where it is located in the physical space, known as localization, and needs to know where obstacles are in the physical space, known as mapping. One technique is simultaneous localization and mapping (SLAM) which uses pairs of images acquired from sensors such as a pair of cameras. The pairs of images are acquired at different times. The images are processed to determine features which are depicted in the images. Features may result from physical structures such as the edge of a door frame, may be visual such as a shadow cast by another object or part of a picture, and so forth. Once a feature has been detected in an image, a descriptor may be determined that describes that feature. Various techniques, such a scale-invariant feature transform (SIFT), may be used to characterize the features and generate the descriptors.

Information about the relative placement of the same features that appear in those images at different times may be used to determine how the AMD has moved. For SLAM to provide the best results, the features in the images need to be stationary in the physical space.

Traditionally, various techniques have been used to try and determine whether a feature is stationary with respect to the physical space or not. For example, random sample consensus (RANSAC) techniques may be used to try and filter out features which exhibit apparent motion that is an outlier. In another example, a machine learning system may be trained to try and recognize moving objects such as people or stationary objects such as architectural features. However, these traditional techniques are computationally intensive, requiring significant processing power and memory and may also take additional time, increasing the latency or amount of time it takes for output to be produced. This increased latency may result in the AMD moving more slowly than would otherwise be desired.

Described in this disclosure is a technique for determining stationary features present in images from a pair of cameras providing stereoimages. A first pair of images are acquired at a first time from a pair of cameras comprising a left camera and right camera. A second pair of images are obtained at a second time from the pair of cameras. A feature that is present in all four images is determined. A first position of the feature at the first time and data from an inertial sensor are used to determine a predicted position at the second time. For example, the inertial sensors may comprise an inertial measurement unit (IMU) with one or more accelerometers, gyroscopes, and so forth.

The predicted position is compared to a second position of the feature at the second time. This comparison takes into consideration an assumed Gaussian error distribution of how the positions are determined. For example, errors may be due to differences in determined position due to sensor noise, a direct linear transformation triangulation process used to determine position, and so forth. If the predicted position differs from the actual position by less than a threshold value, the feature may be determined to be stationary. This process may be repeated for various features in the images. In some implementations groups of features may be designated as stationary or non-stationary using various bounding techniques. For example, a bounding area may be used to designate a portion of an image which is determined to contain moving features. In another example, a bounding volume may be used to designate those features determined to have positions within a certain volume with respect to the physical space.

A resulting set of stationary features may then be used by a SLAM system to determine the localization and trajectory information. While the AMD is moving and SLAM is operating, SLAM provides as output a series of poses, each pose describing a location and orientation in space that are based at least in part on the apparent motion of observed features in the images. For example, a pose may comprise information with respect to six degrees of freedom (6D), such as location along three orthogonal axes and corresponding rotations about those axes. The pose data may be used to provide a trajectory of the AMD. For example, the SLAM system may determine pose data indicative of a location and orientation of the AMD in the physical space based on a pair of images at a given time, using the stationary features. By significantly reducing or eliminating the moving features that are passed to the SLAM system for processing, overall performance of the SLAM system is significantly improved, latency to determine output such as pose data is reduced, and the operation of the AMD is improved. For example, by using the techniques described herein, errors in position accuracy by the SLAM system have been observed to be reduced by approximately 50%. In another example, the techniques have been observed to reduce to less than one-third those situations in which the SLAM system determines a non-physical solution.

Illustrative System

FIG. 1 illustrates a system 100 for determining stationary features in a physical space 102 with an autonomous mobile device (AMD) 104, according to some implementations. In this illustration are an overhead view 106 of the physical space 102 and a scene view 108 of the physical space 102 from the point of view of the sensors on the AMD 104.

One or more obstacles 110 may be present within the physical space 102. For example, obstacles 110 may comprise walls, furnishings, stair wells, people, and so forth. While moving from one location to another, the AMD 104 needs to determine where it is at a given time, determine the location of obstacles 110, and move while avoiding collisions with any of these obstacles 110. A command to move may be the result of an input from the user, a previously scheduled task, responsive to input from one or more sensors, a command from an external computing device, or another source.

The AMD 104 may move through the physical space 102. The motion of the AMD 104 may be described as a trajectory 112, such as shown here. In some implementations the trajectory 112 may comprise a series of poses. Each pose may be indicative of a particular location with respect to a plurality of orthogonal axes and rotation with respect to individual ones of the axes. For example, the pose may comprise information with respect to six degrees of freedom (6D) indicative of coordinates in three-dimensional space with respect to a designated origin, and rotation with respect to each of the three axes.

The AMD 104 may include a battery(s) 114 to provide electrical power for operation of the AMD 104. The battery 114 may be rechargeable, allowing it to store electrical energy obtained from an external source. In other implementations a wireless power receiver may be used to provide power for operation of the AMD 104, recharge the battery 114, and so forth.

One or more motors 116 or other actuators enable the AMD 104 to move from one location in the physical space 102 to another. For example, a motor 116 may be used to drive a wheel attached to a chassis of the AMD 104, which causes the AMD 104 to move. The AMD 104 may turn, move forward, move backward, and so forth. In another example, actuators may move legs allowing the AMD 104 to walk.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interfaces 120. The network interfaces 120 may include devices to connect to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 includes one or more memories 122. The memory 122 may comprise one or more non-transitory computer-readable storage media (CRSM).

The AMD 104 may include one or more sensors 124. For example, the sensors 124 may include a first camera 126(1), a second camera 126(2), an inertial measurement unit (IMU) 130, microphones, time-of-flight (TOF) sensors, and so forth. The first camera 126(1) and the second camera 126(2) may be mounted to a common rigid structure that maintains a relative distance between the cameras 126. An IMU 130 may be attached to this common rigid structure, or one of the cameras affixed thereto. The first camera 126(1) and the second camera 126(2) may be arranged such that a sensor field-of-view (FOV) 128(1) of the first camera 126(1) overlaps at least in part a sensor FOV 128(2) of the second camera 126(2). The sensors 124 may generate sensor data 132. The sensor data 132 may include image data 134 acquired by the first camera 126(1) and the second camera 126(2). A pair of images 136 may comprise image data 134 from the first camera 126(1) and the second camera 126(2) that are acquired at the same time. For example, a first pair of images 136(1) are acquired at time $t_1$ and a second pair of images 136(2) are acquired at time $t_2$. The sensors 124 are discussed in more detail with regard to FIG. 3.

During operation the AMD 104 may determine input data 138. The input data 138 may include or be based at least in part on sensor data 132 from the sensors 124 onboard the AMD 104. In one implementation, a speech processing module may process raw audio data obtained by a microphone on the AMD 104 and produce input data 138. For example, the user may say "robot, come here" which may produce input data 138 "come here". In another implementation, the input data 138 may comprise information such as a command provided by another computing device, such as a smartphone or tablet computer.

A mapping module 140 determines a representation of the physical space 102 that includes the obstacles 110 and their location in the physical space 102. During operation the mapping module 140 uses the sensor data 132 from various sensors 124 to determine information such as where the AMD 104 is, how far the AMD 104 has moved, the presence of obstacles 110, where those obstacles 110 are, and so forth.

A feature module 142 processes at least a portion of the image data 134 to determine first feature data 144. The first feature data 144 is indicative of one or more features 146 that are depicted in the image data 134. The features 146 may be edges of doors, shadows on the wall, texture on the walls, portions of artwork in the physical space 102, and so forth. The physical space 102 may include display devices that are capable of changing the images they portray. For example, a television 148 may be presented in the physical space 102. The picture presented by the television 148 may also have features 146.

Various techniques may be used to determine the presence of features 146 in image data 134. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 146 in the image data 134. A feature 146 that has been detected may have an associated descriptor that characterizes that feature 146. The descriptor may comprise a vector value in some implementations. For example, the descriptor may comprise data indicative of the feature with respect to 256 different dimensions.

The first feature data 144 may comprise information such the descriptor for the feature 146, the images that the feature 146 was detected in, location in the image data 134 of the feature 146, and so forth. For example, the first feature data 144 may indicate that in a first image the feature 146(2) is centered at row 994, column 312 in the first image.

A position determination module 150 determines position data 152 indicative of a position 154 of the feature 146 in the physical space 102. In one implementation the position 154 may be expressed as a set of coordinates with respect to the first camera 126(1). The position determination module 150 may use a direct linear transformation triangulation process to determine the position 154 of a feature 146 in the physical space 102 based on the difference in apparent location of that feature 146 in two images acquired by two cameras 126 separated by a known distance.

A movement determination module 156 determines if the feature 146 is stationary or non-stationary. First position data 152(1) indicative of a first position 154(1) of a feature 146 depicted in the first pair of images 136(1) acquired at time $t_1$ is determined by the position determination module 150. Second position data 152(2) of the same feature 146 indicative of a second position 154(2) of the same feature 146 as depicted in the second pair of images 136(2) acquired at time $t_2$ is determined as well.

The movement determination module 156 may use inertial data from the IM U 130 or other sensors that provides information about how the AMD 104 moved between time $t_1$ and time $t_2$. The inertial data and the first position data 152(1) is used to provide a predicted position of the feature 146 at the second time. The predicted position is compared to the second position data 152(2) to determine if the feature is stationary or non-stationary. If the predicted position is less than a threshold value from the second position 154(2) in the second position data 152(2), then the feature 146 is deemed to be stationary. The movement determination module 156 is discussed in more detail with regard to FIGS. 6 and 7.

Features 146 that have been deemed to be stationary are included in the second feature data 158. The second feature data 158 may thus exclude non-stationary features 146 and comprise a subset of the first feature data 144 which comprises stationary features 146.

The second feature data 158 may be used by a simultaneous localization and mapping (SLAM) module 160. The SLAM module 160 may use second feature data 158 to determine pose data 162 that is indicative of a location of the AMD 104 at a given time based on the appearance of features 146 in pairs of images 136. The SLAM module 160 may also provide trajectory data indicative of the trajectory 112 that is based on a time series of pose data 162 from the SLAM module 160.

Other information, such as depth data from a depth sensor, the position data 152 associated with the features 146 in the second feature data 158, and so forth, may be used to determine the presence of obstacles 110 in the physical space 102 as represented by an occupancy map 164.

The occupancy map 164 may comprise data that indicates the location of one or more obstacles 110, such as a table, wall, stairwell, and so forth. In some implementations, the occupancy map 164 may comprise a plurality of cells with each cell of the plurality of cells representing a particular area in the physical space 102. Data, such as occupancy values, may be stored that indicates whether an area of the physical space 102 associated with the cell is unobserved, occupied by an obstacle 110, or is unoccupied. An obstacle 110 may comprise an object or feature that prevents or impairs traversal by the AMD 104. For example, an obstacle 110 may comprise a wall, stairwell, and so forth.

The occupancy map 164 may be manually or automatically determined. For example, during a learning phase the user may take the AMD 104 on a tour of the physical space 102, allowing the mapping module 140 of the AMD 104 to determine the occupancy map 164. The user may provide input data 138 such as tags designating a particular obstacle type, such as "furniture" or "fragile". In another example, during subsequent operation, the AMD 104 may generate the occupancy map 164 that is indicative of locations and types of obstacles such as chairs, doors, stairwells, and so forth as it moves unattended through the physical space 102.

Modules described herein, such as the mapping module 140, may provide various processing functions such as de-noising, filtering, and so forth. Processing of sensor data 132, such as image data from a camera 126, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 132. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 132 or other data. For example, the ANN may be trained using a supervised learning algorithm such that object identifiers are associated with images of particular objects within training images provided to the ANN. Once trained, the ANN may be provided with the sensor data 132 and produce output indicative of the object identifier.

A navigation map module 166 uses the occupancy map 164 as input to generate a navigation map 168. For example, the navigation map module 166 may produce the navigation map 168 by inflating or enlarging the apparent size of obstacles 110 as indicated by the occupancy map 164.

An autonomous navigation module 170 provides the AMD 104 with the ability to navigate within the physical space 102 without real-time human interaction. The autonomous navigation module 170 may implement, or operate in conjunction with, the mapping module 140 to determine one or more of the occupancy map 164, the navigation map 168, or other representations of the physical space 102. The autonomous navigation module 170 is discussed in more detail with regard to FIG. 2.

The AMD 104 autonomous navigation module 170 may generate path plan data that is indicative of a path through the physical space 102 from the current location to a destination location. The AMD 104 may then begin moving along the path.

While moving along the path, the AMD 104 may assess the physical space 102 and update or change the path as appropriate. For example, if an obstacle 110 appears in the path, the mapping module 140 may determine the presence of the obstacle 110 as represented in the occupancy map 164 and navigation map 168. The now updated navigation map 168 may then be used to plan an alternative path to the destination location.

The AMD 104 may utilize one or more task modules 172. The task module 172 comprises instructions that, when executed, provide one or more functions. The task modules 172 may perform functions such as finding a user, following a user, present output on output devices 174 of the AMD 104, perform sentry tasks by moving the AMD 104 through the physical space 102 to determine the presence of unauthorized people, and so forth.

The AMD 104 includes one or more output devices 174, such as one or more of a motor 116, light, speaker, display, projector, printer, and so forth. One or more output devices 174 may be used to provide output during operation of the AMD 104. The output devices 174 are discussed in more detail with regard to FIG. 3.

The AMD 104 may use the network interfaces 120 to connect to a network 176. For example, the network 176 may comprise a wireless local area network, that in turn is connected to a wide area network such as the Internet.

The AMD 104 may be configured to dock or connect to a docking station 178. The docking station 178 may also be connected to the network 176. For example, the docking station 178 may be configured to connect to the wireless local area network 176 such that the docking station 178 and the AMD 104 may communicate. The docking station 178 may provide external power which the AMD 104 may use to charge the battery 114.

The AMD 104 may access one or more servers 180 via the network 176. For example, the AMD 104 may utilize a wakeword detection module to determine if the user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 180 for further processing. The servers 180 may process the spoken audio and return to the AMD 104 data that may be subsequently used to operate the AMD 104.

The AMD 104 may also communicate with other devices 182. The other devices 182 may include one or more devices that are within the physical space such as a home or associated with operation of one or more devices in the physical space. For example, the other devices 182 may include a doorbell camera, a garage door opener, a refrigerator, washing machine, and so forth. In some implementations the other devices 182 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
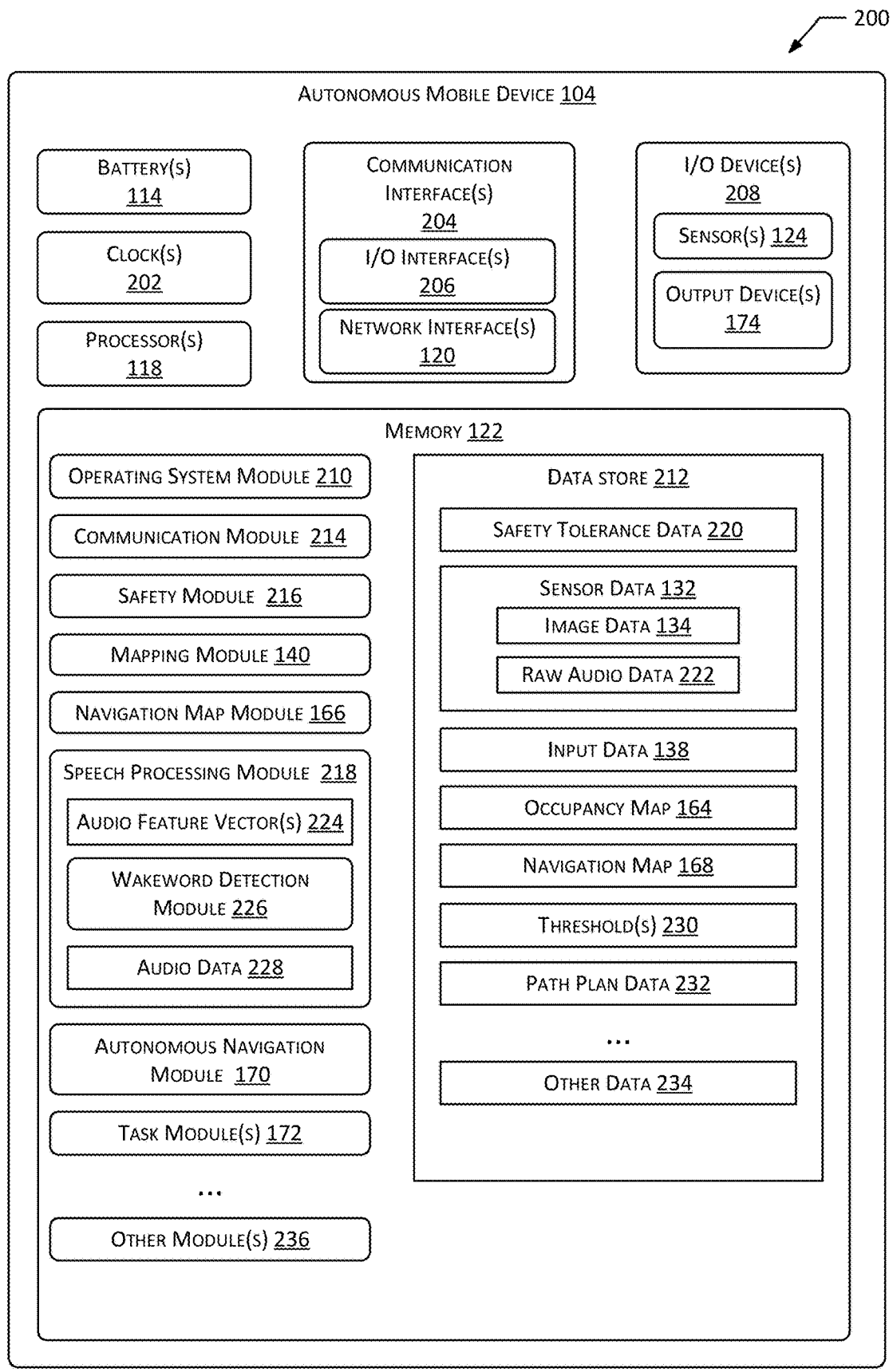
FIG. 2 is a block diagram of the components of the AMD, according to some implementations.

FIG. 2 is a block diagram 200 of the AMD 104, according to some implementations. The AMD 104 may include one or more batteries 114 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action, sensor data 132, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 182 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, mouse, scanner, and so forth. The I/O devices 208 may also include output devices 174 such as one or more of a motor 116, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 182 such as other AM Ds 104, docking stations 178, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth. The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 182 including other AMDs 104, servers 180, network attached storage devices, and so forth.

A communication module 214 may be configured to establish communication with other devices 182, such as other AMDs 104, an external server 180, a docking station 178, and so forth. The communications may be authenticated, encrypted, and so forth.

Other modules within the memory 122 may include a safety module 216, the mapping module 140, the navigation map module 166, the autonomous navigation module 170, the one or more task modules 172, a speech processing module 218, or other modules 236. The modules may access data stored within the data store 212, including safety tolerance data 220, sensor data 132, inflation parameters, other data 234, and so forth.

The safety module 216 may access the safety tolerance data 220 to determine within what tolerances the AMD 104 may operate safely within the physical space 102. For example, the safety module 216 may be configured to stop the AMD 104 from moving when an extensible mast of the AMD 104 is extended. In another example, the safety tolerance data 220 may specify a minimum sound threshold which, when exceeded, stops all movement of the AMD 104. Continuing this example, detection of sound such as a human yell would stop the AMD 104. In another example, the safety module 216 may access safety tolerance data 220 that specifies a minimum distance from an object that the AMD 104 is to maintain. Continuing this example, when a sensor 124 detects an object has approached to less than the minimum distance, all movement of the AMD 104 may be stopped. Movement of the AMD 104 may be stopped by one or more of inhibiting operations of one or more of the motors 116, issuing a command to stop motor operation, disconnecting power from one or more the motors 116, and so forth. The safety module 216 may be implemented as hardware, software, or a combination thereof.

The safety module 216 may control other factors, such as a maximum speed of the AMD 104 based on information obtained by the sensors 124, precision and accuracy of the sensor data 132, and so forth. For example, detection of an object by an optical sensor may include some error, such as when the distance to an object comprises a weighted average between an object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The navigation map module 166 uses the occupancy map 164 as input to generate the navigation map 168. The navigation map module 166 may produce the navigation map 168 to inflate or enlarge the obstacles 110 indicated by the occupancy map 164. One or more inflation parameters may be used during operation. The inflation parameters provide information such as inflation distance, inflation adjustment values, and so forth. In some implementations the inflation parameters may be based at least in part on the sensor FOV 128, sensor blind spot, physical dimensions of the AMD 104, and so forth.

The speech processing module 218 may be used to process utterances of the user. Microphones may acquire audio in the presence of the AMD 104 and may send raw audio data 222 to an acoustic front end (AFE). The AFE may transform the raw audio data 222 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 176 in the form of output audio data. To prevent the output audio interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 180 for speech processing. The audio data 228 corresponding to audio obtained by the microphone may be processed locally on one or more of the processors 118, sent to a server 180 for routing to a recipient device or may be sent to the server 180 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 166, prior to sending to the server 180, and so forth.

The speech processing module 218 may include or access an automated speech recognition (ASR) module. The ASR module may accept as input raw audio data 222, audio feature vectors 224, or other sensor data 132 and so forth and may produce as output the input data 138 comprising a text string or other data representation. The input data 138 comprising the text string or other data representation may be processed by the navigation map module 166 to determine the command to be executed. For example, the utterance of the command "robot, come here" may result in input data 138 comprising the text string "come here". The wakeword "robot" may be omitted from the input data 138.

The autonomous navigation module 170 provides the AMD 104 with the ability to navigate within the physical space 102 without real-time human interaction. The autonomous navigation module 170 may implement, or operate in conjunction with, the mapping module 140 to determine the occupancy map 164, the navigation map 168, or other representation of the physical space 102. In one implementation, the mapping module 140 may use one or more simultaneous localization and mapping ("SLAM") techniques. The SLAM algorithms may utilize one or more of maps, algorithms, beacons, or other techniques to navigate. The autonomous navigation module 170 may use the navigation map 168 to determine a set of possible paths along which the AMD 104 may move. One of these may be selected and used to determine path plan data 232 indicative of a path. For example, a possible path that is the shortest or has the fewest turns may be selected and used to determine the path. The path is then subsequently used to determine a set of commands that drive the motors 116 connected to the wheels. For example, the autonomous navigation module 170 may determine the current location within the physical space 102 and determine a path plan 232 that describes the path to a destination location such as the docking station 178.

The autonomous navigation module 170 may utilize various techniques during processing of sensor data 132. For example, image data 134 obtained from cameras 126 on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 118, in response to a command received from one or more communication interfaces 204, as determined from the sensor data 132, and so forth. For example, an external server 180 may send a command that is received using the network interface 120. This command may direct the AMD 104 to proceed to find a particular user, follow a particular user, and so forth. The AMD 104 may then process this command and use the autonomous navigation module 170 to determine the directions and distances associated with carrying out the command. For example, the command to "come here" may result in a task module 172 sending a command to the autonomous navigation module 170 to move the AMD 104 to a particular location near the user and orient the AMD 104 in a particular direction.

The AMD 104 may connect to the network 176 using one or more of the network interfaces 120. In some implementations, one or more of the modules or other functions described here may execute on the processors 118 of the AMD 104, on the server 180, or a combination thereof. For example, one or more servers 180 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for identification of a particular user, and so forth.

Figure 3:
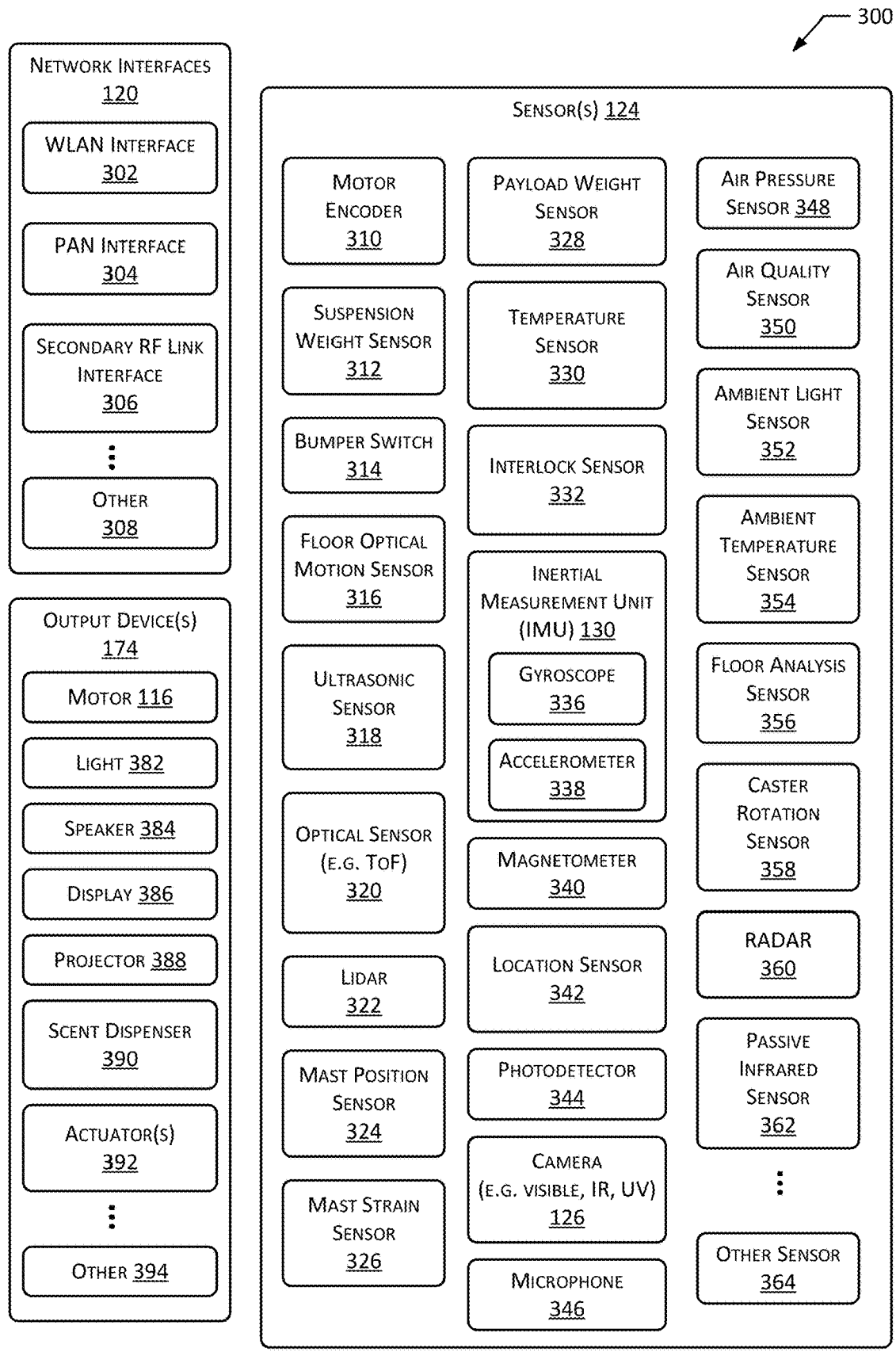
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 174, according to some implementations. The components illustrated here are provided by way of illustration and not necessarily as a limitation. For example, the AMD 104 may utilize a subset of the particular network interfaces 120, output devices 174, or sensors 124 depicted here, or may utilize components not pictured. One or more of the sensors 124, output devices 174, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other 308 interface. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 182 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 178, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 170 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited.

One or more bumper switches 314 provide an indication of physical contact between a bumper or other member that is in mechanical contact with the bumper switch 314. The safety module 216 utilizes sensor data 132 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 132 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 126. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 170 may utilize the sensor data 132 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 132 may be generated that is indicative of the presence of objects and the relative positions, shapes, and so forth that are visible to the lidar 322. Data from the lidar 322 may be used by various modules. For example, the autonomous navigation module 170 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 132 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 114, one or more motors 116, and so forth. In the event the temperature exceeds a threshold value, the component associated with that device temperature sensor 330 may be shut down.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

An inertial measurement unit (IMU) 130 may include a plurality of gyroscopes 336 and accelerometers 338 arranged along different axes. The gyroscope 336 may provide information indicative of rotation of an object affixed thereto. For example, a gyroscope 336 may generate sensor data 132 that is indicative of a change in orientation of the AMD 104 or a portion thereof.

The accelerometer 338 provides information indicative of a direction and magnitude of an imposed acceleration. Data such as rate of change, determination of changes in direction, speed, and so forth may be determined using the accelerometer 338. The accelerometer 338 may comprise mechanical, optical, micro-electromechanical, or other devices. For example, the gyroscope 336 in the accelerometer 338 may comprise a prepackaged solid-state unit.

A magnetometer 340 may be used to determine an orientation by measuring ambient magnetic fields, such as the terrestrial magnetic field. For example, the magnetometer 340 may comprise a Hall effect transistor that provides output compass data indicative of a magnetic heading.

The AMD 104 may include one or more location sensors 342. The location sensors 342 may comprise an optical, radio, or other navigational system such as a global positioning system (GPS) receiver. For indoor operation, the location sensors 342 may comprise indoor position systems, such as using Wi-Fi Positioning Systems (WPS). The location sensors 342 may provide information indicative of a relative location, such as "living room" or an absolute location such as particular coordinates indicative of latitude and longitude, or displacement with respect to a predefined origin.

A photodetector 344 provides sensor data 132 indicative of impinging light. For example, the photodetector 344 may provide data indicative of a color, intensity, duration, and so forth.

A camera 126 generates sensor data 132 indicative of one or more images. The camera 126 may be configured to detect light in one or more wavelengths including, but not limited to, terahertz, infrared, visible, ultraviolet, and so forth. For example, an infrared camera 126 may be sensitive to wavelengths between approximately 700 nanometers and 1 millimeter. The camera 126 may comprise charge coupled devices (CCD), complementary metal oxide semiconductor (CMOS) devices, microbolometers, and so forth. The AMD 104 may use image data acquired by the camera 126 for object recognition, navigation, collision avoidance, user communication, and so forth. For example, a pair of cameras 126 sensitive to infrared light may be mounted on the front of the AMD 104 to provide binocular stereo vision, with the sensor data 132 comprising images being sent to the autonomous navigation module 170. In another example, the camera 126 may comprise a 10 megapixel or greater camera that is used for videoconferencing or for acquiring pictures for the user.

The camera 126 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 126, particularly those associated with navigation or autonomous operation, may utilize a global shutter. In other implementations, the camera(s) 126 providing images for use by the autonomous navigation module 170 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth.

In another example, the air quality sensor 350 may include a hygrometer that provides information indicative of relative humidity.

An ambient light sensor 352 may comprise one or more photodetectors or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 170, the task module 172, and so forth. For example, if the floor analysis sensor 356 determines that the floor is wet, the safety module 216 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 124 may include a radar 360. The radar 360 may be used to provide information as to a distance, lateral position, and so forth, to an object.

The sensors 124 may include a passive infrared (PIR) sensor 362. The PIR 362 sensor may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 170. One or more touch sensors may be utilized to determine contact with a user or other objects.

The AMD 104 may include one or more output devices 174. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 116 with an eccentric weight may be used to create a buzz or vibration to allow the AMD 104 to simulate the purr of a cat.

Figure 4:
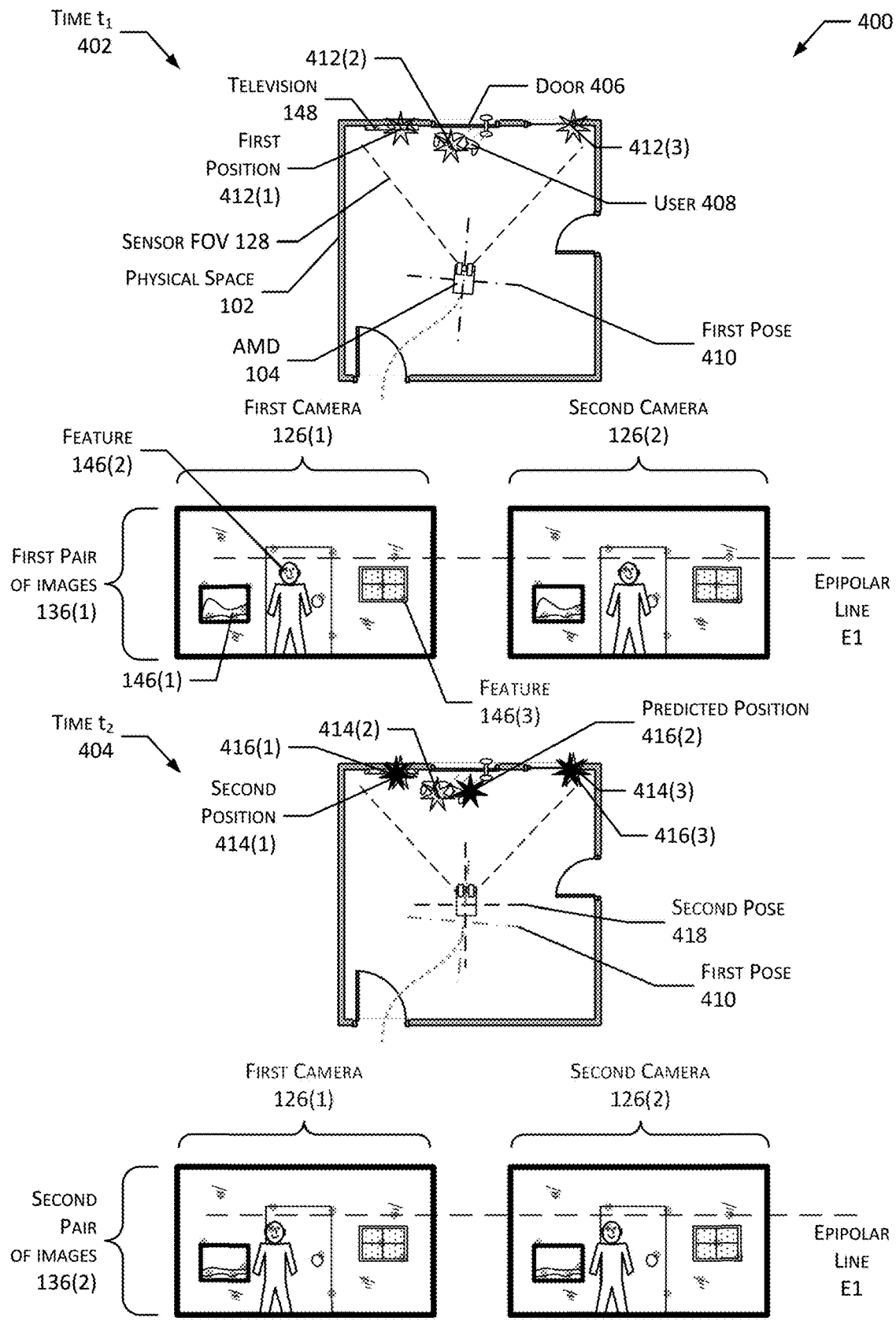
FIG. 4 illustrates the physical space, features, and positions of those features, according to some implementations.

FIG. 4 illustrates at 400 the physical space 102, features 146, and positions 154 of those features 146, according to some implementations. Illustrations are shown for time $t_1$ at 402 and time $t_2$ at 404. The physical space 102 may include doors 406, users 408, the television 148 or other display device, and so forth.

The AMD 104 is shown at a first pose 410, with the sensor FOV 128 directing the first camera 126(1) and the second camera 126(2) towards a wall. First positions 412 of features 146 at time $t_1$ as determined by the position determination module 150 are shown as well. Also shown is a predicted position 416(2) of the feature 146 associated with the user 408 for time $t_2$. The movement determination module 156 may use the first position 412 at time $t_1$ and data from sensors 124 such as the IMU 130 describing the motion between times $t_1$ and $t_2$ to determine the predicted position 416. The predicted position 416 may be considered to express where the feature 146 would be located in space if the only motion was due to movement of the AMD 104.

Also shown is the corresponding first pair of images 136(1) acquired at time $t_1$. Several features 146 that have been determined by the feature module 142 to be in the images are depicted, indicated by small shaded circles. For example, a feature 146(1) is indicated on a picture presented by the television 148, a feature 146(2) is indicated on a portion of the head of the user 408, and a feature 146(3) is indicated on a corner of a window.

An epipolar line E1 is shown extending through the same horizontal line of both images in the first pair of images 136(1). In this illustration, lens distortions have been corrected for in the images as depicted. As a result, the epipolar line extends horizontally. In some implementations, the epipolar relationships between points in the pair of images 136 may be expressed in terms of a fundamental matrix which takes into consideration the intrinsic calibration matrices of the images from the first camera 126(1) and the second camera 126(2).

At 404 the physical space 102 and corresponding second pair of images 136(2) are shown. Between time $t_1$ and $t_2$ the user 408 and the AMD 104 have each moved. For example, the AMD 104 has moved from the first pose 410 to the second pose 418. Second positions 414 of features 146 at time $t_2$ as determined by the position determination module 150 are shown as well. Because the user 408 has moved, the second position 414(2) associated with the feature 146(2) of the user 408 has also moved.

Figure 5:
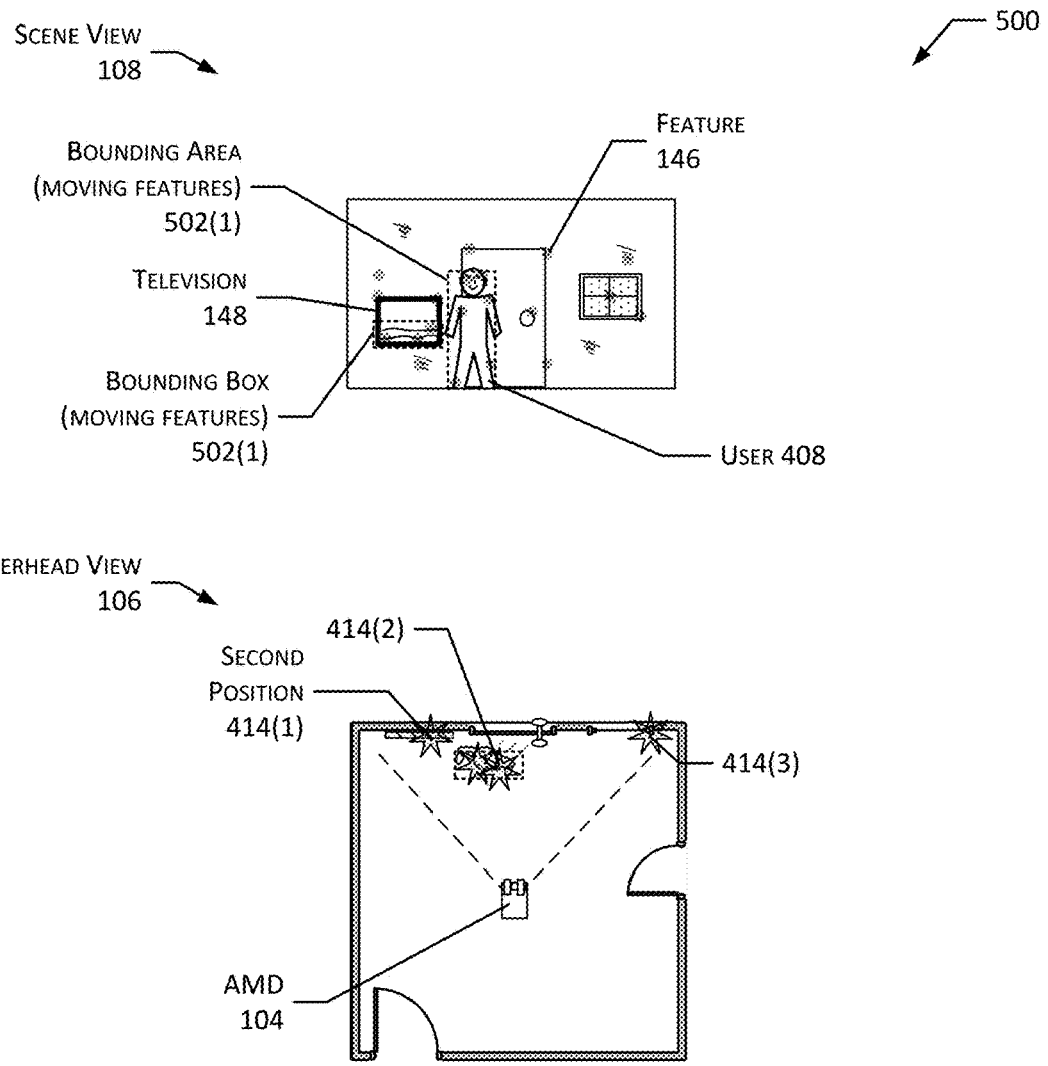
FIG. 5 illustrates bounding moving features of an image or bounding positions within a volume that are associated with moving features, according to some implementations.

FIG. 5 illustrates at 500 bounding moving features 146 of an image or bounding positions within a volume that are associated with moving features 146, according to some implementations. Various factors, including sensor noise, uncertainty introduced during calculation, and so forth, may result in some individual features 146 being incorrectly designated as stationary or non-stationary. For example, the feature 146 presented on a television 148 may move on screen while the television 148 itself remains fixed in the physical space 102. In some implementations it may also be advantageous to avoid determining whether a given feature 146 is stationary or not when that feature 146 is associated with a moving object having features 146.

In one implementation, the movement determination module 156 may designate a bounding area 502, such as a bounding box, with respect to those features 146 deemed to be moving. The bounding area 502 may be determined based at least in part on the presence of features 146 that have been determined to be non-stationary. For example, a portion of the features 146 in the first feature data 144 may be processed to determine whether those features are stationary or not.

Bounding areas 502 may be designated with respect to the image data 134 based on those features 146 deemed to be associated with a moving feature 146, or with respect to the physical space 102. In one implementation, the outermost features 146 determined to be moving may be used to designate a region within the image data 134 within which the features 146 are assumed to be moving. Continuing the example, in one implementation the moving features 146 on the edges of the user 408 as depicted in the image data 134 may be used to designate a bounding area 502(1). The features 146 within that bounding area 502 may be designated as being moving, may not be provided to the movement determination module 156, and may also not be included in the second feature data 158 provided to the SLAM module 160. Likewise, a bounding area 502(2) is determined due to the apparent movement of the features 146 presented on the television 148. In implementations where the bounding area 502 describes an area with respect to the image data 134, subsequent feature detection may be omitted for the area within the bounding area 502, further determination of whether a feature 146 within the bounding area 502 may be omitted, and so forth. As a result, the number of features 146 to be processed decreases, resulting in a decrease in the use of computational resources to evaluate the image data 134.

The bounding area 502 may be constrained to a maximum size. For example, the bounding area 502 may be limited to having an area no larger than 5% of the image.

In some implementations, a bounding area 502 may be designated when a density of features 146 determined to be moving exceeds a threshold value. For example, if the number of moving features 146 within an area within an image measuring 100×100 pixels exceeds a threshold number, the area may be designated as a bounding area 502 and all features within that bounding area 502 may be designated as moving features or otherwise be disregarded.

In another implementation clustering techniques may be used to determine clusters of features 146 that are stationary, non-stationary, or both. For example, techniques such as k-means clustering, density based clustering, neural networks, and so forth may be used to arrange features 146 into clusters or groupings. These may be groupings of stationary features 146 or non-stationary features 146.

In some implementations, features 146 may be tracked between subsequent frames of image data 134. Information about that feature 146 being tracked may be associated across different frames of image data 134 and different times. For example, a moving feature 146 in one frame of image data 134 may be deemed to be a moving feature 146 in another frame. Different techniques to track features 146 may be used. For example, an optical flow based tracking algorithm may be used to track a feature 146 as it appears in multiple frames.

By significantly reducing the number of moving features 146 that are provided to the SLAM module 160, significant improvements in performance are realized. For example, the SLAM module 160 may utilize a multidimensional solver which, if moving features 146 are present, may result in non-physical solutions. For example, the SLAM module 160 may erroneously consider the moving features 146 and come to a non-physical solution, such as determining that the location of the AMD 104 has changed by 100 meters between t1 and t2. By using the techniques described in this disclosure, errors in position accuracy by the SLAM module 160 have been observed to be reduced by approximately 50%. In another example, a reduction to less than one-third in the determination of non-physical solutions by the SLAM module 160 have been observed during testing of the techniques described herein.

Figure 6:
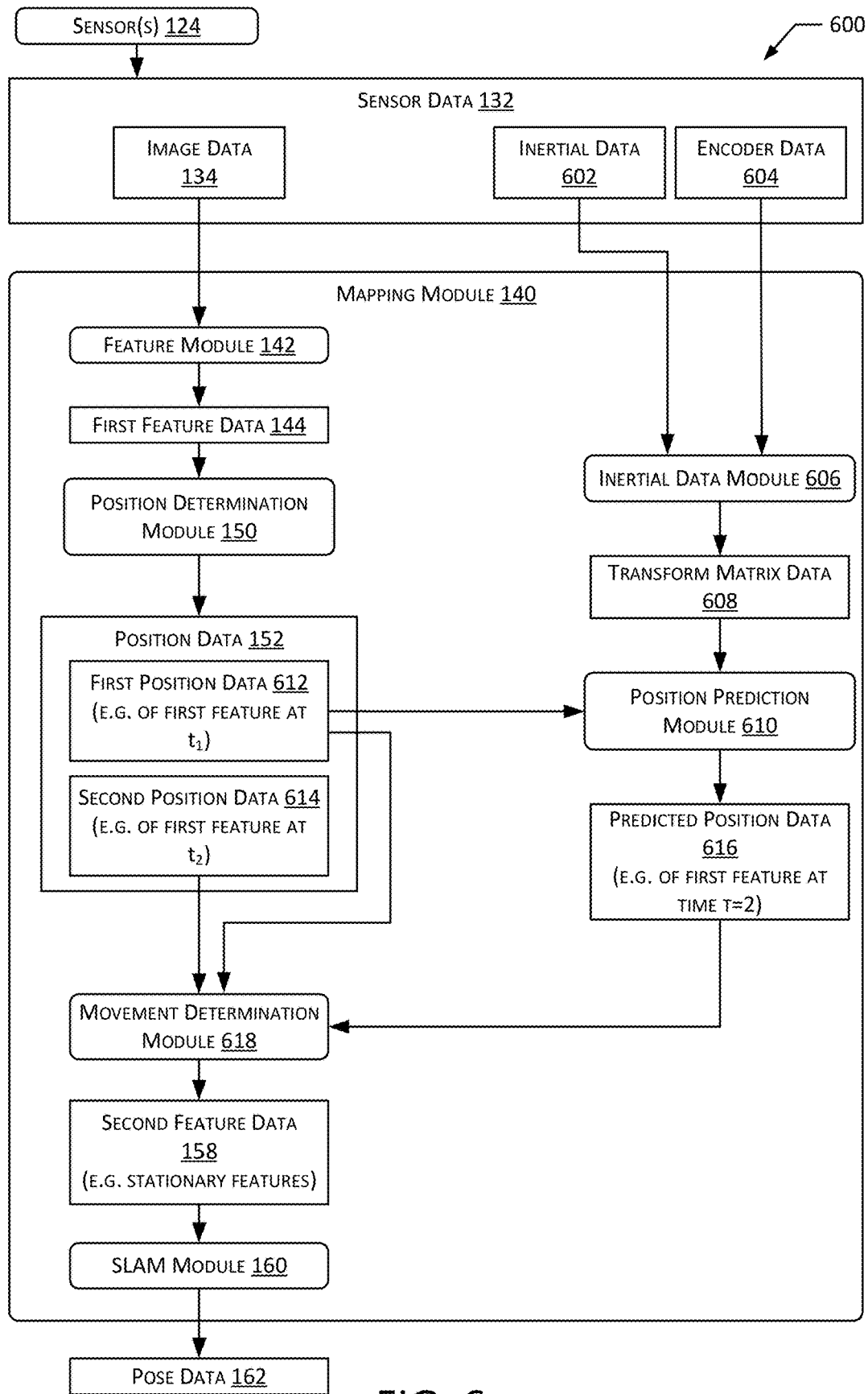
FIG. 6 illustrates a mapping module that determines stationary features for subsequent use in localization and mapping, according to some implementations.

FIG. 6 illustrates at 600 a mapping module 140 that determines stationary features for subsequent use in localization and mapping, according to some implementations. While the functionality is described with respect to the mapping module 140, it is understood that other modules could perform one or more of the operations described herein.

One or more sensors 124 provide sensor data 132. The sensor data 132 includes image data 134. For example, the image data 134 may comprise pairs of images 136, each pair being acquired at different times by the first camera 126(1) and the second camera 126(2). The IMU 130 may provide inertial data 602. For example, the inertial data 602 may comprise data indicative of one or more translations and rotations of the AMD 104 from time $t_1$ to time $t_2$. Encoder data 604 may also be provided. For example, the encoder data 604 may be indicative of a direction of rotation and number of rotations of a motor 116, such as a drive motor used to move the AMD 104. In another implementation, a wheel encoder may be used that provide rotation information about a freely spinning wheel such as a caster. In yet another implementation, an independent downward facing camera may be used to gather images of the floor and use this data to determine odometry data.

One or more of the inertial data 602 or the encoder data 604 may be provided to an inertial data module 606. The inertial data module 606 determines transform matrix data 608 comprising a transform matrix that relates the second pose 418 of the AMD 104 to the first pose 410 of the AMD 104. For example, the transform matrix data 608 may describe a rigid transformation matrix of the difference in six degrees of freedom (6D) between time $t_1$ and time $t_2$ and may include a rotation matrix and a translation vector. The transform matrix data 608 is provided to a position prediction module 610 described below.

At least a portion of the image data 134 is provided to the feature module 142 which provides as output first feature data 144. The first feature data 144 may include features 146 that are stationary and non-stationary.

The position determination module 150 uses the first feature data 144 to determine position data 152. The position data 152 may include first position data 612 indicative of the position 154 of the feature 146 at time $t_1$ and second position data 614 indicative of the position 154 of the feature 146 at time $t_2$. In some implementations, the position determination module 150 may be combined or integrated with a feature module 142.

The first position data 612 may be provided to the position prediction module 610 and the movement determination module 618. The second position data 614 may also be provided to the movement determination module 618.

The position prediction module 610 uses the transform matrix data 608 and the first position data 612 to determine predicted position data 616. For example, the position prediction module 610 may apply the transform matrix data 608 to the first position data 612 to determine the predicted position data 616. The predicted position data 616 may be considered to be the predicted position 416 of the feature 146 if the feature 146 were stationary. The predicted position data 616 is provided to the movement determination module 618.

The movement determination module 618 determines whether the predicted position data 616 of the feature 146 at time $t_2$ is within a threshold value of the second position 414 indicated in the second position data 614. If the variation between the predicted position data 616 is less than the threshold value, the feature 146 may be deemed stationary. If the variation is greater than the threshold value, the feature 146 may be deemed to be non-stationary (moving).

The movement determination module 618 may provide as output the second feature data 158 comprising those features 146 which are deemed to be stationary. As mentioned above, in some implementations the movement determination module 618 may use bounding areas 502 to determine the second feature data 158.

The second feature data 158 may be provided to the SLAM module 160. Based on the features 146 which are deemed to be stationary, the SLAM module 160 may generate the pose data 162, data indicative of the trajectory 112, and may provide other information such as information about obstacles 110 in the environment to determine the occupancy map 164. The SLAM module 160 may process the second feature data 158 or use one or more additional techniques. For example, a RANSAC algorithm may be used to process the second feature data 158.

The processes performed with regard to the modules may be described using the following equations. These equations are provided by way of illustration, and not necessarily as a limitation.

Each camera 126 may have an associated projection matrix that uses a pinhole camera model to map a three-dimensional (3D) point in the physical space 102 to a two-dimensional (2D) point in an image. For the purposes of discussion, the first camera 126(1) is a left camera, mounted to the left of the second camera 126(2) that is mounted to the right of the first camera 126(1). Let the projection matrix of the first camera 126(1) be $M_L = K_L$ and the projection matrix of the second camera 126(2) camera be $M_R = K_R [R\ t]$ where $K_L$ is the intrinsic matrix for the first camera 126(1) and $K_R$ is the intrinsic matrix for the second camera 126(2) and R, t are the rotation matrix and translation vector for the extrinsic matrices from the first camera 126(1) to the second camera 126(2).

Consider a 3D point X in the physical space 102 that is observed in both left and right images at times $t_1$ and $t_2$, such as the point associated with position 154(2). Let $p_1$ be the projection of X in a left image acquired at $t_1$, $p_1$' be the projection of that point in a right image acquired at $t_1$. Let $p_2$ be the projection of X in a left image acquired at $t_2$ and $p_2$' be its projection in right image acquired at $t_1$.

Let the rigid transformation matrix of the difference in 6DOF pose of device between $t_1$ and $t_2$ be $T_d = [R_d\ t_d]$ where $R_d$ is the rotation matrix and $t_d$ is the translation vector. For example, the transform matrix data 608 may comprise the rigid transformation matrix as determined using the inertial data 602.

The system 100 may use a direct linear transformation (DLT) triangulation algorithm to determine where in the physical space 102 point X is from stereo pairs of images that include a feature 146 as acquired at times $t_1$ and $t_2$. The DLT triangulation algorithm is described by Richard Hartley and Andrew Zisserman, "*Multiple View Geometry in Computer Vision*", (Cambridge University Press 2003).

A stereo pair may comprise a first pair of images acquired at $t_1$ 136(1) and a second pair of images acquired at $t_2$ 136(2) by the first camera 126(1) and the second camera 126(2). Let $X_1$ be the determined position 154 of point X for the feature 146 as computed from a stereo pair $p_1$, $p_1$' at $t_1$ and $X_2$ be the position 154 determined from stereo pair $p_2$, $p_2$' at $t_2$. The predicted position 416 of $X_1$ may be determined based on device movement from $t_1$ to $t_2$ as: $\hat{X}_2 = R_d X_1 + t_d$. Then $\Delta X_2 = \hat{X}_2 - X_2$ describes the variation between the predicted position $\hat{X}_2$ and the determined position $X_2$ For a 3D point associated with a stationary feature 146 between $t_1$ and $t_2$, assume that $\Delta X_2$ is distributed Gaussian with mean $\mu = 0$ and covariance $\Sigma_\Delta$. Then $\Sigma_\Delta$ may be determined using forward error propagation with the following set of equations:

$$\sum_\Delta = \mathrm{Cov}(\hat{X}_2) + \mathrm{Cov}(X_2)$$
$$= J_{R_d} \mathrm{Cov}(R_d) J_{R_d} + \mathrm{Cov}(t_d) + J_{X_1} \mathrm{Cov}(X_1) J_{X_1}^T + \mathrm{Cov}(X_2)$$

where $$J_{R_d} = \frac{\partial \hat{X}_2}{\partial R_d} = -[R_d X_1]_x$$

$$[a]_x = \begin{bmatrix} 0 & -a_3 & a_2 \\ a_3 & 0 & -a_1 \\ -a_2 & a_1 & 0 \end{bmatrix}$$

$$a = [a_1, a_2, a_3]^T$$

$$J_{X_1} = \frac{\partial \hat{X}_2}{\partial X_1} = R_d$$

Substituting the above in the expression for $\Sigma_\Delta$ the following equation is determined:

$$\Sigma_\Delta = [R_d X_1]_x \mathrm{Cov}(R_d)[R_d X_1]_x^T + \mathrm{Cov}(t_d) + R_d \mathrm{Cov}(X_1) R_d^T + \mathrm{Cov}(X_2)$$

For the movement of the AMD 104 from $R_d$ and $t_d$ for the device motion from $t_1$ and $t_2$, the inertial data 602 may be used comprising data sampled from the IMU 130 between $t_1$ that is associated with the first pair of images 136(1) and $t_2$ that is associated with the second pair of images 136(2). This data may be pre-integrated. A bias estimate may be obtained using most recent Local Bundle Adjustment optimization output from the SLAM module 160. The values of Cov(R$_d$) and Cov(t$_d$) may be determined using the data from the pre-integration.

The values for Cov(X$_1$) and Cov(X$_2$) describe the covariance for stereo triangulation, which takes into consideration uncertainty involved in the DLT triangulation algorithm. These covariances may be determined using the approach described by Di Leo, Giuseppe, Consolatina Liguori, and Alfredo Paolillo "*Covariance propagation for the uncertainty estimation in stereo vision*", (IEEE Transactions on Instrumentation and Measurement 60.5 (2011): 1664-1673).

As discussed above, 3D point X can then be found using the DLT triangulation algorithm by solving the following over-determined linear system with least-squares technique.

$$\begin{bmatrix} u_L M_{L3}^T - M_{L1}^T \\ v_L M_{L3}^T - M_{L2}^T \\ u_R M_{R3}^T - M_{R1}^T \\ v_R M_{R3}^T - M_{R2}^T \end{bmatrix} \begin{bmatrix} x \\ y \\ z \\ 1 \end{bmatrix} = \begin{bmatrix} 0 \\ 0 \\ 0 \\ 0 \end{bmatrix}$$

Let this be f=AX=0. f is a function of seven uncertain quantities $u_L$, $v_L$, $u_R$, $v_R$, which are normalized pixel co-ordinates of an observed feature point in the left and right image and x, y, z, which are the 3D co-ordinates of that point of the feature 146 with respect to the first camera 126(1). More particularly, ($u_R$, $v_R$) is the observation of 3D point X in the right image and ($u_L$, $v_L$) is its observation in the left image. Also, $M_{Ly}^T$ above refers to the $y^{th}$ row of the projection matrix M. In some implementations it may be assumed that there is no uncertainty in estimating the calibration parameters. Then the co-variance of the 3D point X can be found by solving the equation:

$$J_X \Sigma_X J_X^T = J_v \Sigma_v J_v^T$$

$$\Sigma_X = Cov(X) = J_X^A (J_v \Sigma_v J_v^T)(J_X^A)^T$$

where $J_X^A = (J_X^T J_X)^{-1} J_X^T$ and X here refers to triangulated 3D point X and v refers to the four normalized pixel co-ordinates. Furthermore, $$J_X = \left\{ \frac{df_i}{dX_j} \right\}_{i=1,2,3,4 \ j=1,2,3}$$

$$= \begin{bmatrix} u_L M_{L31} - M_{L11} & u_L M_{L32} - M_{L12} & u_L M_{L33} - M_{L13} \\ v_L M_{L31} - M_{L21} & v_L M_{L32} - M_{L22} & v_L M_{L33} - M_{L23} \\ u_R M_{R31} - M_{R11} & u_R M_{R32} - M_{R12} & u_R M_{R33} - M_{R13} \\ v_R M_{R31} - M_{R21} & v_R M_{R32} - M_{R22} & v_R M_{R33} - M_{LR23} \end{bmatrix}$$

$$\sum_v \begin{bmatrix} \sigma_{u_L}^2 & 0 & 0 & 0 \\ 0 & \sigma_{v_L}^2 & 0 & 0 \\ 0 & 0 & \sigma_{u_R}^2 & 0 \\ 0 & 0 & 0 & \sigma_{v_H}^2 \end{bmatrix}$$

$$J_v = \left\{ \frac{df_i}{dv_j} \right\}_{i=1,2,3,4 \ j=1,2,3,4}$$

$$= \begin{bmatrix} M_{L2}^T X & 0 & 0 & 0 \\ 0 & M_{L3}^T X & 0 & 0 \\ 0 & 0 & M_{R3}^T X & 0 \\ 0 & 0 & 0 & M_{R3}^T X \end{bmatrix}$$

With the value for $\Sigma_\Delta$ determined, it is possible to determine based on the error value $\Delta X_2$ for a particular feature 146 whether that feature 146 is deemed to be stationary or moving. In one implementation, a determination is made as to how far the error value $\Delta X_2$ is, in units of standard deviation, from the mean for the multivariate (3 dimensional) Gaussian distribution $\mathcal{N}$ (0, $\Sigma_\Delta$). In this implementation, the distance D in units of standard deviation, also known as a Mahalanobis distance, of $\Delta X_2$ from the mean 0 may be determined as follows:

$$D = \sqrt{\Delta X_2^T \Sigma^{-1} \Delta X_2}$$

The determination as to whether a particular feature 146 is stationary or moving may be determined by comparing D with a threshold value. For example, if the distance D is less than a threshold value, the feature 146 may be deemed to be stationary.

Figure 7:
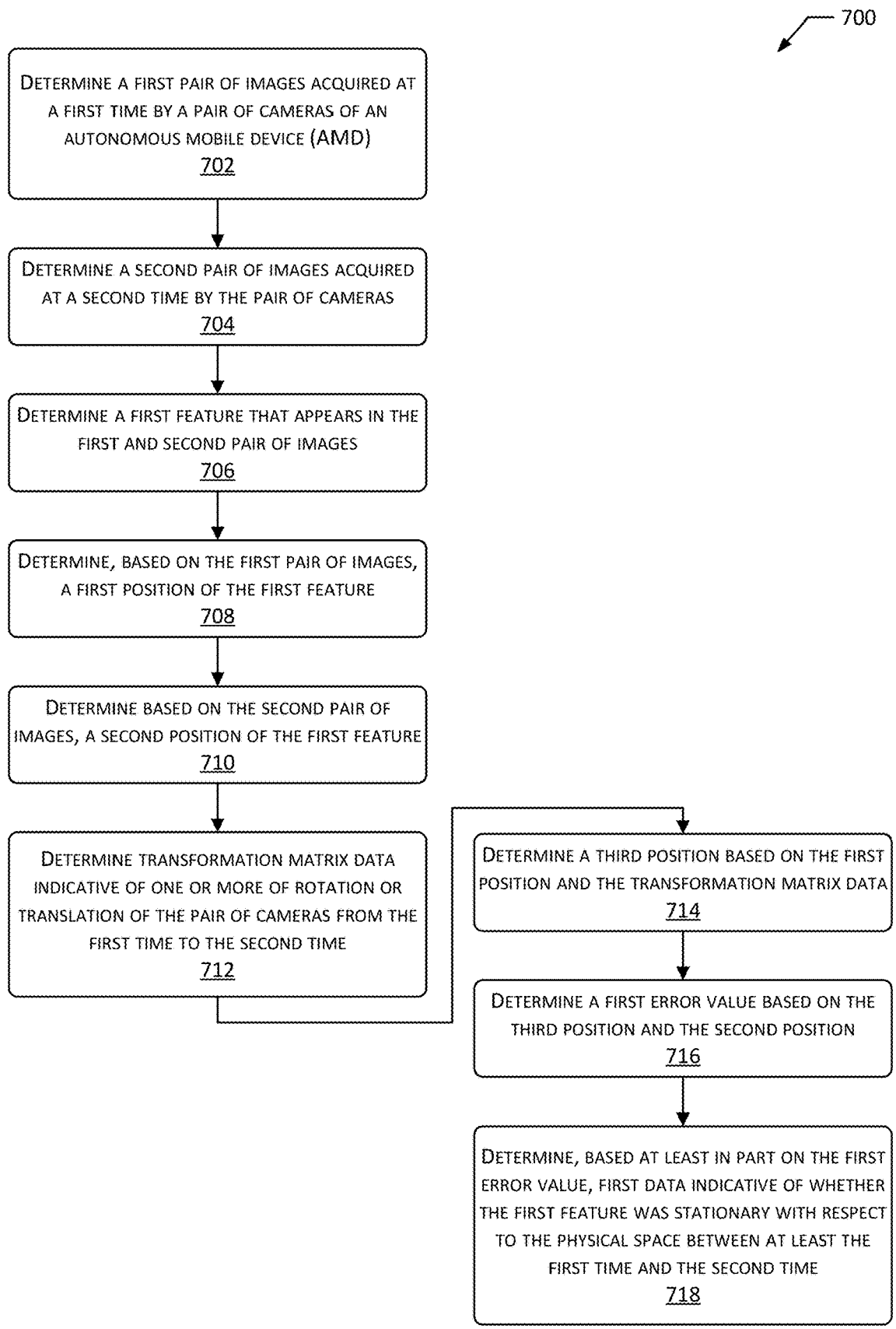
FIG. 7 is a flow diagram of a process for determining stationary features, according to some implementations.

FIG. 7 is a flow diagram 700 of a process for determining stationary features, according to some implementations. The process may be implemented at least in part by one or more of the AMD 104, the docking station 178, a server 180, or other device 182.

At 702 a first pair of images 136(1) is determined. The first pair of images 136(1) may comprise a first image 134(1) acquired at a first time $t_1$ from a first camera 126(1) of a pair of cameras 126 and a second image 134(2) acquired at the first time $t_1$ from a second camera 126(2) of the pair of cameras 126. At least a portion of a first sensor FOV 128 of the first camera 126(1) overlaps at least a portion of a second sensor FOV 128 of the second camera 126(2).

At 704 a second pair of images 136(2) is determined. The second pair of images 136(2) may comprise a third image 134(3) acquired at a second time $t_2$ from the first camera 126(1) and a fourth image 134(4) acquired at the second time $t_2$ from the second camera 126(2).

At 706 a first feature 146 is determined that appears in the first and second pairs of images. For example, the feature module 142 may determine a feature 146 that is depicted in the first, second, third, and fourth images. The feature 146 may be deemed to be the same across all the images if the descriptors for the feature 146 as it appears in each of the images corresponds to one another to within a threshold similarity value. For example, if the feature 146 in the first image 134(1) has a similarity to a feature 146 in the second image 134(2) with a similarity value of 0.90, the feature in the two images may be deemed to be the same feature 146.

At 708 a first position 412 $X_1$ of the first feature 146 is determined at time $t_1$ based on the first pair of images 136(1). For example, the position determination module 150 may determine the first position 412 of the feature 146 relative to the first camera 126(1). In other implementations the first position 412 may be given with respect to another reference point.

At 710 a second position 414 $X_2$ of the first feature 146 is determined based on the second pair of images 136(2).

In some implementations features may be discarded that are greater than a threshold distance from an epipolar line associated with first position 412 $X_1$. An epipolar line may be determined with respect to the second camera 126(2) that is associated with the first position 412 $X_1$ in the fourth image with respect to the first camera 126(1). If the apparent position of the first feature 146 in a virtual image plane associated with the fourth image is within a threshold distance to the epipolar line, the first feature 146 may be subsequently processed as described herein. If the apparent position is greater than the threshold distance to the epipolar line, the first feature 146 may be removed from further consideration. During operation, a stationary feature 146 may appear to be on the same epipolar line in both images of the pair of images 136 when the first camera 126(1) and the second camera 126(2) are rigidly mounted and fixed relative to one another. In comparison, the moving feature 146 in the pair of images 136 may appear to be on different epipolar lines.

At 712 transformation matrix data 608 indicative of one or more of rotation or translation of the pair of cameras 126 from the first time $t_1$ to the second time $t_2$ is determined. For example, the inertial data module 606 may determine the transformation matrix data 608 based at least in part on data from the IMU 130.

At 714 a third position, the predicted position 416 $X_2$, is determined based on the first position 412 and the transformation matrix data 608.

At 716 a first error value $\Delta X_2$ is determined based on the third position and the second position 414.

At 718 based at least in part on the first error value $\Delta X_2$, first data is determined that is indicative of whether the first feature 146 was stationary with respect to the physical space 102 between at least the first time $t_1$ and the second time $t_2$. For example, a Mahalanobis distance D of the first error value from the mean of 0 may be calculated. If the Mahalanobis distance D is greater than a threshold value, then the feature 146 may be deemed to be moving. If distance D is less than the threshold value, then the feature 146 may be deemed to be stationary.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
a pair of cameras comprising a left camera and a right camera;
an inertial measurement unit (IMU);
one or more motors coupled to one or more wheels;
one or more memories storing first computer-executable instructions; and
one or more processors to execute the first computer-executable instructions to:
acquire, at a first time and of a physical space, a first image with the left camera and a second image with the right camera;
acquire, at a second time and of the physical space, a third image with the left camera and a fourth image with the right camera;
determine a first feature that is visible in the first image, the second image, the third image, and the fourth image;
determine a first position of the first feature in the physical space relative to the left camera based on the first image and the second image;
determine a second position of the first feature relative to the left camera based on the third image and the fourth image;
acquire, from the first time to the second time, inertial data from the IMU;
determine, based on the inertial data, transformation matrix data comprising (i) a rotation matrix indicative of rotation of the pair of cameras from the first time to the second time in the physical space and (ii) a translation vector indicative of translation of the pair of cameras from the first time to the second time in the physical space;
determine a third position indicative of a predicted position of the first feature at the second time based on the first position and the transformation matrix data;
determine a first error value associated with the first feature based on the third position and the second position;
determine a second value based on the first error value and a mean value; and
determine that the first feature is stationary between the first time and the second time based on the second value being less than a threshold value.

2. The AMD of claim 1, the one or more processors to further execute the first computer-executable instructions to:
determine, based on the first feature as depicted in the third image and the fourth image, a first pose of the AMD indicative of a location and orientation of the AMD in the physical space.

3. A method performed at least in part by an autonomous mobile device (AMD), the method comprising:
acquiring, using one or more processors of the AMD, a first pair of images comprising (i) a first image of a physical space acquired at a first time from a first camera of a pair of cameras of the AMD and (ii) a second image of the physical space acquired at the first time from a second camera of the pair of cameras of the AMD, wherein at least a portion of a first field of view of the first camera overlaps at least a portion of a second field of view of the second camera;
acquiring, using the one or more processors of the AMD, a second pair of images comprising (iii) a third image of the physical space acquired at a second time using the first camera and (iv) a fourth image of the physical space acquired at the second time using the second camera;
determining, using the one or more processors of the AMD, a first feature that is visible in the first image, the second image, the third image, and the fourth image;
determining, using the one or more processors of the AMD, a first position of the first feature in the physical space relative to the first camera based on the first pair of images;
determining, using the one or more processors of the AMD, a second position of the first feature in the physical space relative to the first camera based on the second pair of images;
acquiring, from the first time to the second time, sensor data from one or more sensors of the AMD;
determining, using the one or more processors of the AMD, first data indicative of one or more of rotation or translation of the pair of cameras from the first time to the second time based on the sensor data;
determining, using the one or more processors of the AMD, a third position indicative of a predicted location of the first feature at the second time, based on the first position and the first data;
determining, using the one or more processors of the AMD, a first error value based on the third position and the second position, wherein the first error value is indicative of a variation between the third position and the second position; and
determining, using the one or more processors of the AMD, second data indicative of whether the first feature was stationary with respect to the physical space between at least the first time and the second time based at least in part on the first error value.

4. The method of claim 3, further comprising:
determining, using the one or more processors of the AMD, an epipolar line associated with the first position in the fourth image; and
determining, using the one or more processors of the AMD, an apparent position of the first feature in a virtual image plane associated with the fourth image is within a threshold distance of the epipolar line.

5. The method of claim 3, wherein:
the sensor data is indicative of one or more of:
inertial data acquired from an inertial measurement unit affixed to the AMD, or
wheel movement data associated with one or more wheels of the AMD.

6. The method of claim 3, wherein the first data comprises a rotation matrix and a translation vector; and further comprising:
determining, using the one or more processors of the AMD, a first covariance of the rotation matrix;
determining, using the one or more processors of the AMD, a second covariance of the translation vector;
determining, using the one or more processors of the AMD, a third covariance of the first position;
determining, using the one or more processors of the AMD, a fourth covariance of the second position;
determining, using the one or more processors of the AMD, a first value based at least in part on the rotation matrix, the first position, the first covariance, the second covariance, the third covariance, and the fourth covariance; and
wherein the first error value is a distributed Gaussian with a mean value of 0 and a fifth covariance equal to the first value.

7. The method of claim 6, further comprising:
determining, using the one or more processors of the AMD, a second value based on the first error value and the mean value, wherein the second value is indicative of a number of standard deviations that the first error value is from the mean value of the distributed Gaussian; and
wherein the determining the second data is indicative of the first feature being stationary comprises determining the second value is less than a threshold value.

8. The method of claim 3, further comprising:
determining, using the one or more processors of the AMD, a second feature that is visible in the first image, the second image, the third image, and the fourth image;
wherein the second data is indicative of the first feature being non-stationary;
determining, using the one or more processors of the AMD, a first portion of the third image that includes the first feature;
determining, using the one or more processors of the AMD, the second feature is within the first portion of the third image; and
determining, using the one or more processors of the AMD, the second feature is non-stationary.

9. The method of claim 3, further comprising:
determining, using the one or more processors of the AMD, a first set of features that are visible within a first portion of the third image, wherein features in the first set of features are determined to be non-stationary;
determining, using the one or more processors of the AMD, a count of the features in the first set of features that are determined to be non-stationary exceeds a threshold value; and
determining, using the one or more processors of the AMD, one or more features within the first portion of the third image are non-stationary.

10. The method of claim 3, wherein the second data indicates the first feature is stationary; and further comprising:
determining, using the one or more processors of the AMD, data indicative of a location and orientation of the AMD in the physical space with respect to one or more axes based at least in part on the first feature as visible in the second pair of images.

11. The method of claim 3, further comprising:
determining, using the one or more processors of the AMD, the first position using direct linear transformation triangulation using the first image and the second image; and
determining, using the one or more processors of the AMD, the second position using direct linear transformation triangulation using the third image and the fourth image.

12. An autonomous mobile device (AMD) comprising:
a pair of cameras comprising a first camera and a second camera;
an inertial sensor;
one or more actuators;
one or more memories storing first computer-executable instructions; and
one or more processors to execute the first computer-executable instructions to:
  acquire a first pair of images of a physical space comprising (i) a first image of the physical space acquired at a first time from the first camera and (ii) a second image of the physical space acquired at the first time from the second camera;
  acquire a second pair of images of the physical space comprising (iii) a third image of the physical space acquired at a second time from the first camera and (iv) a fourth image of the physical space acquired at the second time from the second camera;
  determine a first feature that is visible in the first image, the second image, the third image, and the fourth image;
  determine, based on the first pair of images, a first position of the first feature in the physical space relative to the first camera;
  determine, based on the second pair of images, a second position of the first feature in the physical space relative to the first camera;
  acquire, from the first time to the second time, inertial data from the inertial sensor;
  determine first data indicative of one or more of rotation or translation of the pair of cameras from the first time to the second time based on the inertial data;
  determine a third position indicative of a predicted location of the first feature at the second time, based on the first position and the first data;
  determine a first error value based on the third position and the second position, wherein the first error value is indicative of a variation between the third position and the second position; and
  determine, based at least in part on the first error value, second data indicative of the first feature being stationary with respect to the physical space between at least the first time and the second time.

13. The AMD of claim 12, the one or more processors to further execute the first computer-executable instructions to:
determine an epipolar line associated with the first position in the fourth image; and
determine an apparent position of the first feature in a virtual image plane associated with the fourth image is within a threshold distance of the epipolar line.

14. The AMD of claim 12, wherein:
the inertial sensor comprises an inertial measurement unit.

15. The AMD of claim 12, wherein the first data comprises a rotation matrix and a translation vector; and the one or more processors to further execute the first computer-executable instructions to:
determine a first covariance of the rotation matrix;
determine a second covariance of the translation vector;
determine a third covariance of the first position;
determine a fourth covariance of the second position;
determine a first value based at least in part on the rotation matrix, the first position, the first covariance, the second covariance, the third covariance, and the fourth covariance; and
wherein the first error value is a distributed Gaussian with a mean value of 0 and a fifth covariance equal to the first value.

16. The AMD of claim 15, the one or more processors to further execute the first computer-executable instructions to:
determine a second value based on the first error value and the mean value, wherein the second value is indicative of a number of standard deviations that the first error value is from the mean value of the distributed Gaussian; and
wherein the first computer-executable instructions to determine the second data compare the second value to a threshold value.

17. The AMD of claim 12, the one or more processors to further execute the first computer-executable instructions to:
determine a second feature that is visible in the first image, the second image, the third image, and the fourth image;
wherein the second data is indicative of the first feature being stationary;
determine a first portion of the third image that includes the first feature and the second feature; and
determine the second feature is stationary.

18. The AMD of claim 12, the one or more processors to further execute the first computer-executable instructions to:
determine a first set of features that are visible within a first portion of the third image, wherein features in the first set of features are determined to be non-stationary;
determine a count of the features in the first set of features that are determined to be non-stationary exceeds a threshold value; and
determine one or more features within the first portion of the third image are non-stationary.

19. The AMD of claim 12, wherein the second data indicates the first feature is stationary; and the one or more processors to further execute the first computer-executable instructions to:
determine, based at least in part on the first feature being visible in the second pair of images, data indicative of a location and orientation of the AMD in the physical space with respect to one or more axes.

20. The AMD of claim 12, the one or more processors to further execute the first computer-executable instructions to:
determine the first position using direct linear transformation triangulation using the first image and the second image; and
determine the second position using direct linear transformation triangulation using the third image and the fourth image.

* * * * *